US010797879B2

(12) United States Patent
Liu (10) Patent No.: US 10,797,879 B2
(45) Date of Patent: Oct. 6, 2020

(54) METHODS AND SYSTEMS TO FACILITATE AUTHENTICATION OF A USER

(71) Applicant: Lawrence Liu, Chesterfield, VA (US)

(72) Inventor: Lawrence Liu, Chesterfield, VA (US)

( * ) Notice: Subject to any disclaimer, the term of this patent is extended or adjusted under 35 U.S.C. 154(b) by 353 days.

(21) Appl. No.: 16/026,642

(22) Filed: Jul. 3, 2018

(65) Prior Publication Data

US 2020/0014538 A1  Jan. 9, 2020

(51) Int. Cl.
*H04L 9/32* (2006.01)
*H04L 9/08* (2006.01)
*H04L 9/14* (2006.01)

(52) U.S. Cl.
CPC .......... *H04L 9/3228* (2013.01); *H04L 9/0825* (2013.01); *H04L 9/0869* (2013.01); *H04L 9/0897* (2013.01); *H04L 9/14* (2013.01); *H04L 9/3231* (2013.01); *H04L 9/3247* (2013.01); *H04L 9/3297* (2013.01)

(58) Field of Classification Search
CPC ... H04L 9/3228; H04L 9/0825; H04L 9/0869; H04L 9/0897; H04L 9/14; H04L 9/3231; H04L 9/3247; H04L 9/3297
USPC ......................................................... 713/186
See application file for complete search history.

(56) References Cited

U.S. PATENT DOCUMENTS

| | | | | |
|---|---|---|---|---|
| 5,987,129 A | * | 11/1999 | Baba ..................... | H04L 9/0847 380/279 |
| 10,585,564 B2 | * | 3/2020 | Vasudev ............... | H04L 67/141 |
| 2019/0156313 A1 | * | 5/2019 | Persaud ............... | G06Q 20/405 |

* cited by examiner

*Primary Examiner* — Kambiz Zand
*Assistant Examiner* — Benjamin A Kaplan (57) ABSTRACT

Disclosed is a method of facilitating authentication of a user. The method may include performing at least one of generating and receiving, using a processor, a primary cryptographic identifier consisted of a primary public key and a primary private key. Further, the method may include generating, using the processor, a global static user identifier corresponding to the user based on the primary public key. Further, the method may include generating, using the processor, a digital signature corresponding to a service based on a unique identifier associated with the service and the primary cryptographic identifier. Further, the method may include generating, using the processor, a key generation seed based on the digital signature and the global static user identifier. Further, the method may include generating, using the processor, a secondary cryptographic identifier including a secondary public key based on the key generation seed.

22 Claims, 7 Drawing Sheets

METHODS AND SYSTEMS TO FACILITATE AUTHENTICATION OF A USER

FIELD OF THE INVENTION

The present disclosure relates generally to data processing. More specifically, the present disclosure describes methods and systems to facilitate authentication of a user.

BACKGROUND OF THE INVENTION

In the Internet era, an online authentication process typically begins with prompting a user to input a login user name and a password. A website or an application (generally referred to as service hereafter) then verifies the input against information obtained during the user registration with the service. Despite its popular use, password-based authentication delivers poor security and clumsy user experience. It's not only inherently weak against many common cyber threats but also creates unpleasant friction to flattering online user experience as many users are averse to creating yet another password given the challenge they already face in keeping track of the existing ones. Various methods which have been created as additional measures to strengthen the password-based authentication approach, often with the expense of further degradation of user experience, fail to address its fundamental security weaknesses.

Naturally some solutions resorted to using public key cryptosystem based authentication in attempts to eliminate the need of a password as the sign-in credential, hoping by extension they would also eliminate all security weaknesses associated with the user's handling of passwords. Authentication using PKI (Public-Key Infrastructure) client certificates is one of such solutions in which the public key embedded in the client certificate is used to verify a session specific digital signature created using the client's private key that itself is never transmitted across the network. Although PKI certificate-based authentications are considerably more secure than those of password based, the initial setup cost and the required on-going infrastructure support make them only practical in very limited environments.

With the emergence of personal mobile devices such as smartphones, public key cryptography based authentication approaches became attractive again. Rather than relying on the full fledge PKI infrastructure, these new mobile centric solutions operate on the user's public-private key pairs directly, often with the user's login identifier (or ID) derived from the public key itself. However, major challenges arise in such solutions when it comes to the needs of supporting multiple services at once or porting the login ID after it has been materialized in an online transaction. Although the need of changing a registered ID is expected to be rare given key compromises may be far less likely than password compromises since private keys are never needed to be entered or sent over the network. Nevertheless, representing user with a single permanent ID across all websites and applications (collectively referred as services, service providers, service operators or their corresponding singular forms hereafter) elevates user privacy concerns because a single permanent ID would allow service providers to track user online activities with much ease than it has ever been. A user however could generate a unique key pair for each service they register with to thwart ID based cross-site tracking techniques. However, as the number of registered accounts increases so may the burden of managing the additional keys, forcing users to choose between privacy and convenience. Another problem from such practice is identity fragmentation, which makes it difficult if not impossible for a user to prove the ownership or associability of disparate identifiers when such proof becomes necessary.

A better approach for addressing the last issue described above is to programmatically derive unique user identifiers for different services. One such example is the opaque Pairwise Pseudonymous Identifiers (PPID) used in OpenID for identifying users at different relying parties. While PPID spares the user from having to manually manage multiple identifiers at differently relying parties, they are not able to address the needs of correlating identities across multiple services.

Accordingly, there is a need for improving the methods and systems to facilitate authentication of a user to overcome one or more the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

A method of facilitating authentication of a user is disclosed. The method may include performing at least one of generating and receiving, using a processor, a primary cryptographic identifier (or ID for short) consisted of a primary public key and a primary private key. Further, the primary cryptographic identifier may be associated with the user. Further, the method may include generating, using the processor, a global static user identifier corresponding to the user based on the primary public key. Further, the method may include generating, using the processor, a digital signature corresponding to a service based on a unique identifier associated with the service and the primary cryptographic identifier. Further, the method may include generating, using the processor, a key generation seed based on the digital signature and the global static user identifier. Further, the method may include generating, using the processor, a secondary cryptographic identifier based on the key generation seed. Further, the secondary cryptographic identifier may include a secondary public key and a secondary private key. Further, the secondary cryptographic identifier may be associated with the service. Further, the method may include secure transmission of the secondary public key to the service (e.g. a service provider device) directly or via intermediary devices.

A processor for facilitating authentication of a user is also disclosed. The processor may be configured for performing at least one of generating and receiving a primary cryptographic identifier consisted of a primary public key and a primary private key. Further, the primary cryptographic identifier may be associated with the user. Further, the processor may be configured for generating a global static user identifier corresponding to the user based on the primary public key. Further, the processor may be configured for generating a digital signature corresponding to a service based on a unique identifier associated with the service and the primary cryptographic identifier. Further, the processor may be configured for generating a key generation seed based on the digital signature and the global static user identifier. Further, the processor may be configured for generating a secondary cryptographic identifier based on the key generation seed. Further, the secondary cryptographic identifier may include a secondary public key and a secondary private key. Further, the secondary cryptographic identifier may be associated with the service.

Further, a system for facilitating authentication of a user is disclosed. The system may include a communication device configured for receiving a service request from a client device associated with a user. Further, the communication device may include a transmitting a unique session identifier to the client device. Further, the communication device may be configured for receiving a signed session identifier from the client device. Furthermore, the signed session identifier may be generated based on cryptographically signing the unique session identifier using a secondary private key of a secondary cryptographic identifier associated with the user. Further, the communication device may be configured for receiving a secondary public key of the secondary cryptographic identifier. Additionally, the system may include a processing device configured for generating the unique session identifier. Further, the processing device may be configured for validating the signed session identifier based on the secondary public key. Further, processing device may be configured for authenticating the user for provisioning of a service based on the validating.

A mobile device for facilitating authentication of a user is also disclosed. Further, the mobile device may include a processing unit configured for receiving an authentication request, including a unique identifier associated with a service. Further, the processing unit may be configured for generating, storing and securing a primary cryptographic identifier including a primary public key and a primary private key. Further, the primary cryptographic identifier may be associated with the user from a storage device. Further, the processing unit may be configured for generating a digital signature corresponding to the service based on a unique identifier and the primary cryptographic identifier. Further, the processing unit may be configured for generating a secondary cryptographic identifier based on the primary cryptographic identifier and the digital signature. Further, the secondary cryptographic identifier may include a secondary public key and a secondary private key. Further, the secondary cryptographic identifier may be associated with the service. Further, the method may include secure transmission of the secondary public key to the service directly or via intermediary devices. Further, authentication of the user may be accomplished by the service based on the session signature validation using the secondary public key.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, may be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of facilitation of authentication of a user, embodiments of the present disclosure are not limited to use only in this context. For instance, although the present disclosure uses authentication of an online user as a setting for illustrative purposes, the teaching of the present disclosure may be applicable to other scenarios as well. For example, the teaching of the present disclosure may be used to perform authentication of a user (e.g. a human, an autonomous vehicle, a robot etc.) in relation to physical access control devices.

Overview:

The present disclosure describes a cryptographic scheme that can be used to generate user identifiers whose ownerships are verifiable upon request. The present disclosure also describes a system that can leverage such cryptographic identifiers, for example, in online user registration and authentication processes. The cryptographic scheme and methods presented in this disclosure may provide one or more of the following advantages compared to solutions existed today:

- Enable the use of verifiable but unintelligible cryptographic identifiers by websites and/or applications (collectively referred to as services, service providers, service operators or their corresponding singular forms hereafter) for identifying and authenticating registered users.
- A third party or a group of colluding parties cannot determine or prove whether multiple account identifiers belong to a same person without cooperation from the account owner(s).
- A user is able to prove ownership as well as relationships of identified accounts without also revealing a global Internet ID of the user.
- A user is able to reveal the global Internet ID without the fear of revealing the ownership of all accounts associated with the user.
- Having a user's global Internet ID, a service operator can fully verify a user identifier belonging to a particular service, but won't be able to acquire the user's exclusive ability of producing identifiers and keys for other services.
- With the present disclosure it is possible to configure large enough space for the user identifiers and keys to accommodate safe mappings for all services with a tolerable risk of ID collision.

Generation of Cryptographic Identifiers and Keys (OG1)

The steps detailed below incorporate aspects of RSA (Rivest Shamir Adelman) cryptography and ECC (Elliptic Curve Cryptography) in a two-stage approach. However, the actual implementation of the present disclosure does not have to be limited to this exact arrangement. It is possible to realize the same idea of the present disclosure using other public key cryptosystems.

1. Computationally generate a public-private key pair (Q, d) using a public key cryptography algorithm capable of producing safe deterministic digital signatures. The integer factorization-based RSA algorithm is a good candidate to suit this need. Permanently store the generated key pair in non-volatile memory of the user's mobile device. The stored key pair should be protected with strong symmetric key encryption. Additionally, device authentications such as biometric scans or passcode etc. should be employed for access control of the stored information.
2. Convert the public key Q to an octet string or a base64 encoded string as the user's static global Internet identifier $\mathcal{G}$, which may also be stored on the user's mobile device so it can be readily accessible when the user identifier for a specific service needs to be dynamically generated.
3. To derive the user's identifier for a specific service, the user's mobile device digitally signs the unique identifier of the service using the private key d generated in step 1 to obtain signature $\mathcal{S}$. Then, 4. Initialize ECC domain parameters for a pre-selected curve and create a key generation seed e using a HMAC function with $\mathfrak{s}$ being the HMAC key and $\mathscr{g}$ being the input message. The hash function for the HMAC should have the same bit length as the ECC key size.
5. Let $n$ be the order of the cyclic group generated by the base point G=(xG, yG) on elliptic curve E($\mathbb{F}_q$) ($n$ needs to be large enough to allow safe mapping of identifiers with a sufficiently low risk of collision).
6. e←e (mod $n$ )
7. Compute point $\mathcal{P}$ =eG
8. If $\mathcal{P} = \mathcal{O}$ (i.e. $\mathcal{P}$ overlaps the additive identity of the curve group at infinity) then e←⌊e/h⌋+k where h and k are small constants. Otherwise skip step 9 and execute step 10.
9. Repeat step 7 and 8.
10. Convert $\mathcal{P}$ (without using public key compression to ensure consistency) to an octet string or a base64 encoded string as the user's identifier $r$ for the specific service. Hereafter, e and $\mathcal{P}$ are to be used as the private key and public key respectively for approving and verifying user login sessions associated with $r$.
  Note: The actual operation of step 8 above may vary as long as the calculation is able to consistently yield seed e that results uniform distributions of $\mathcal{P}$ on curve E.

System for Persisting and Managing Cryptographic Identifiers and Keys

The operations detailed in OG1 may be carried out by a custom application V running on a portable computing device such as a smartphone, tablet computer or other mobile devices equipped with adequate processor and sensors. V could include a secure vault and specialized access control mechanisms such as fingerprint reader, retina scanner or other biometric hardware sensors for a secure binding of the device to its actual owner. The secure vault may typically be implemented as a database with strong symmetric key encryption such as the AES256 and/or by leveraging the protected data access offered by the platform (e.g. the keychain on iOS). To unlock the secure vault, the user may need to pass the access control which could also include a biometric scanner or passcode-based authentication. Q, d and $\mathscr{g}$ can be secured by V in its secure vault along with additional user identifying information such as name, age, address, phone, PIN or SSN etc.

An online service W may collaborate with V either directly or indirectly through intermediary servers to authenticate the user's access.

In some instances, to maximize overall system security, communications between W and V may be carried out via separate communication channels (such as mobile push notification or the data link provided by the cellular network) from the primary channel (typically the Internet connection to user's computer) used by the user to initiate the login.

Online User Registration Using Cryptographic Identifiers

Traditionally, online user registration involves asking the users to create a login name and a password in addition to providing other identifying information such as name, address, phone number, age and etc. While the login name and password are later used for granting access to the user's account, other identifying information is often used in business transactions. The user identifying information can also be used to restore user account access in case the login credential becomes invalid or unavailable. As an example, a user who forgot his login password could also have lost access to his recovery email account at the same time. A common practice to restore access for such user is to update the login information after verifying the user using other identifying information known to the service. Because passwords are becoming increasingly susceptible to various hacking and phishing threats many services have resorted to requesting even more information (e.g. mobile numbers, secret questions etc.) from their subscribers in attempts to mitigate the weak password authentication.

Using the cryptographic identifiers and keys described in this disclosure online services may no longer need to ask the user lengthy questions during registrations since miniscule amount of information could suffice a secure user authentication in a proper implementation of the present disclosure. Moreover, because passwords may no longer be needed under this new login paradigm, the users may not be asked to create and remember one, thus significantly simplifying the user registration process, resulting in better user engagement and conversions in addition to a stronger protection of user privacy.

According to the present disclosure, the basic information required to establish a new account is the user identifier $r$ produced (in OG1) for the specific service W. Further, in some embodiments, at least one other piece of information (e.g. user's email address) to be collected, along with $r$ during the registration. This additional information may allow future communication with the user and to reset the account access when necessary. With the present disclosure, it may no longer be necessary to ask the user to create a login ID or password during the registration since authentication may be carried out through the use of public key digital signatures, which drastically improves system security over the password-based approach. Additionally, because W can extract and decode public key $\mathcal{P}$ from a registered $r$, it is thus also possible for V to exchange a shared symmetric encryption key with W via a key exchange protocol such as the ECDH (Elliptic Curve Diffie Hellman). With a shared encryption key in place V and W may then able to establish a secure communicating channel C over which sensitive information held in V can be uploaded to W whenever it's needed as opposed to having each W maintain its own copy of the same information redundantly across the Internet. By limiting the amount of sensitive information stored at each service we also reduce the incentive for the would-be attackers to breach them. Services leveraging the present disclosure may effectively render the popular cross-site shadow attacks unworkable because user's login may be unique to each W, no more unwitty sharing of same user login information across different services.

Authenticate Online User Sessions Using Cryptographic Identifiers and Keys (OG2)
1. User visits a service W and attempts to gain access to a pre-registered account through the login page.
2. W initiates a new session with a unique session ID which is then sent together with the unique identifier of Was an authentication request to the user's mobile device V, either directly or indirectly via intermediary devices.
3. V extracts (Q, d) saved in step 1 of OG1 after verifying the device owner using its access control mechanisms.
4. V repeats steps 2-10 of OG1 to obtain the user identifier $r$ specific to service W, and its corresponding private key e.
5. V signs the authentication response (comprised of at least the session ID, the unique identifier, the user identifier $r$, current timestamp and a security nonce) with e using a public key digital signature algorithm such as the ECDSA (Elliptic Curve Digital Signature Algorithm) before sending the result together with $r$ to service W.

6. Service W first tries to locate the account registered under $r$. If the account exists and is active W then extracts $\mathcal{P}$ from $r$ and uses $\mathcal{P}$ to verify the signature created by V in step 5 above. If the signature is valid W grants the user access to the account associated with $r$ until the session ends. Otherwise, the user access to the service is denied.

Prove Multiple Identifiers Belonging to the Same User without Disclosing $g$ or $s$ Because the identifier of a service W must always be unique, $r$ ends up being different for different W even when $g$ stays the same. In other words $r_{w1} \neq r_{w2}$ given same $g$. It is generally beneficial for a user to use a different $r$ with each service and not reveal the correlations of identifiers registered with different services for maximum privacy benefit. However, there are times a user may want or need to disclose the ownerships of multiple accounts represented by different cryptographic identifiers. For instance, a user may want to demonstrate the fact that both $r_{w1}$ and $r$ $r_{w2}$ are under his control. With the present disclosure the user may be able to achieve this by signing a unique request for proof (incl. a timestamp) using the private keys correspond to $r_{w1}$ and $r_{w2}$ respectively. From V the user is be able to obtain the corresponding private keys by repeating the steps 3-4 of OG2. Third parties may then be able to validate the two signatures using $\mathcal{P}_{w1}$ (decoded from $r_{w1}$) and $\mathcal{P}_{w2}$ (decoded from $r_{w2}$) respectively. If both signatures are valid and the request for proof is unique then the user has demonstrated control over both accounts.

Disclosing $g$ and its Relationship with a Specific Identifier $r$

In the above the case the user was able to prove ownership of multiple identifiers simply by using the private keys associated with the corresponding identifiers to sign a request for proof along with a timestamp. Taking a step further where such demonstration may not be adequate enough to prove these identifiers were all derived from a single $g$, nor is it adequate enough to establish any relationship between a specific identifier $r$ and $g$.

Occasionally (e.g. under court orders) a user and/or a service operator may be legally compelled to disclose the user identifier $r$ with the service, as well as the global Internet identifier $g$ associated with it. Under such circumstances the user can disclose both $g$ and the service specific $s$ to allow the full validation of $g$, $r$ and their correlation. It is worth to point out that by disclosing both $g$ and $s$ the user has unveiled the secret used to derive the private key e for that specific service. Under normal circumstances where the attestation and certification only involve the service operator this type of disclosures shouldn't be an issue of great concern, provided the service operator (usually) is the custodian of the user account and user data managed by the service anyway. Equally noteworthy is the fact that by revealing $g$ and $s$ associated with a particular service W, the user is not giving away his exclusive ability to produce identifiers and keys for other services since the user's global private key d is always required to generate valid $s$ for each service and the user may never need to disclose the global private key d under all circumstances. Likewise, having only $g$ and $s$ for a particular service one cannot derive $r$ and e for a different service. As a result, the present disclosure can drastically improve privacy protection for online users.

Replacing $r$ after its Disclosure

The present disclosure allows the user to transfer an account registered with a given service W to a different identifier $r'$ after the disclosure of $r$. This is accomplished by concatenating an account annexation number to the unique identifier prior to running step 3 in OG1. The appended number can be obtained from the service registration and login screen. By using an account annexation number, it is possible to transfer user's account at W from $r$ to $r'$ without changing the user's global identifier $g$.

Replacing User's Global Identifier $g$

With the present disclosure, in some instances, the user may be able to keep the primary key pair (Q, d) (acquired in step 1 of OG1) permanently safe and secure. In the real world, when enough care is not taken various situations could render the primary keys permanently inaccessible or lost from the user. In such cases the user may have to replace the global identifier $g$ then reinstate all registered accounts using identifiers derived from the new $g'$—a process that may not be trivial but still achievable with the present disclosure.

The exact steps required to reinstate a registered account may vary from service to service. Given the limited amount of information collected, some service operators may prefer conducting out-of-band user verification before transferring user's account to a different $r$. For example, a banking website could require its customers to call in to verify certain account and/or transaction information before transferring the account from an old $r$ to a new $r'$. Various technical tools could be employed to assist along the steps of this process. Online key escrow service is one such tools that could allow the user to recover from lost device or account access with minimum effort. Spanning escrow service is a practice that enables the user to span different bits of a digital record across different escrow service providers to minimize the risk and damage from any potential breach at a particular escrow service provider. When correctly implemented online key escrow services could afford the user and service providers extra time and opportunity to update accounts at risk to new identifiers using current valid keys, avoiding the burdensome process of a full account reinstatement.

Figure 1:
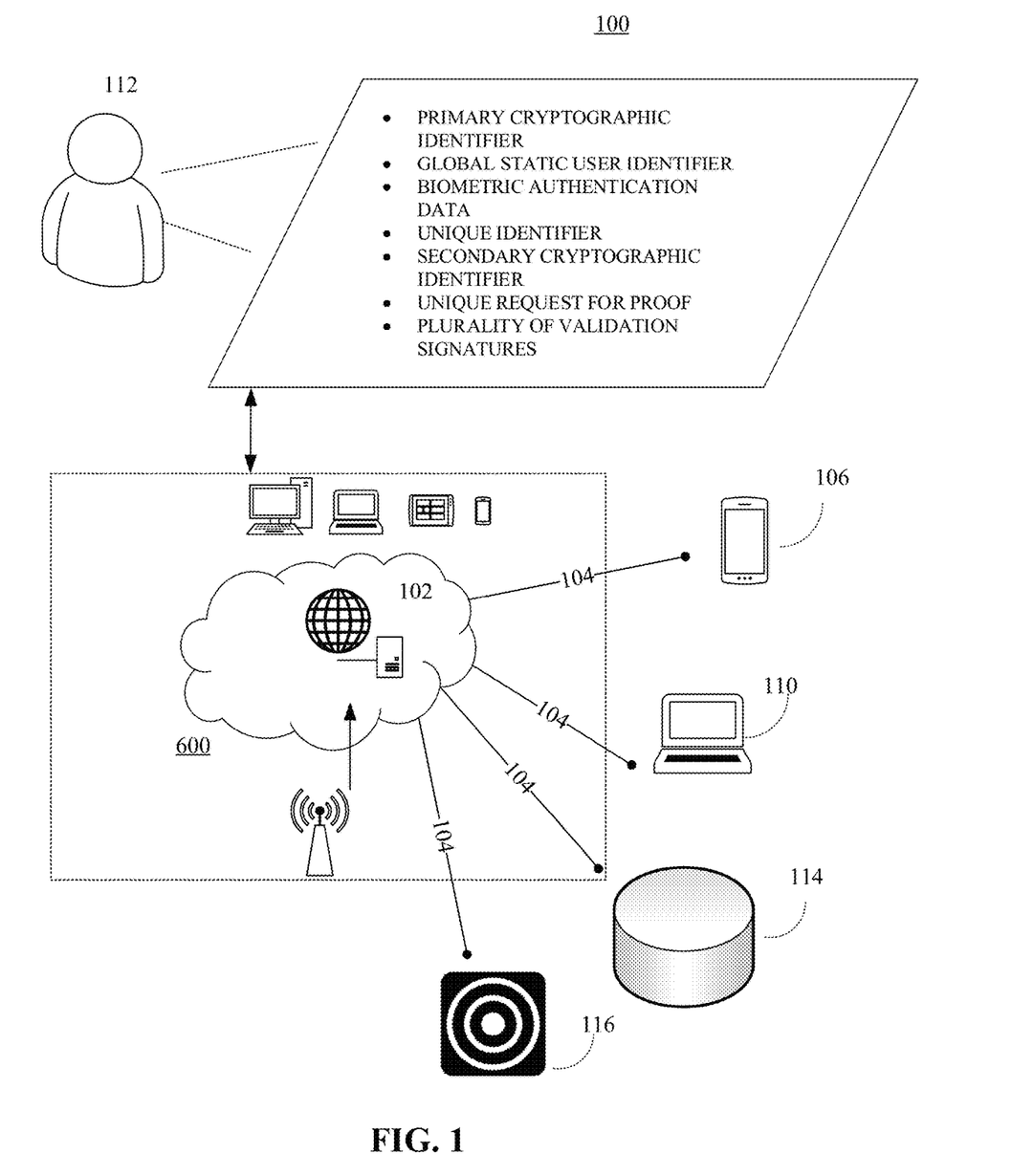
FIG. 1 is an illustration of an online platform consistent with various embodiments of the present disclosure.

FIG. 1 is an illustration of a system 100 consistent with various embodiments of the present disclosure. By way of non-limiting example, the system 100 to facilitate authentication of a user may be hosted on a centralized server 102, such as, for example, a cloud computing service. The centralized server 102 may communicate with other network entities, such as, for example, a mobile device 106 (such as a smartphone, a laptop, a tablet computer etc.), other electronic devices 110 (such as desktop computers, server computers etc.), databases 114, and sensors 116 (e.g. a biometric sensor such as, but not limited to, fingerprint sensor, iris scanner, facial recognition sensor, etc.), over communication channels 104, such as, but not limited to, the Internet, SMS (Short Message Service), various cellular data network technologies such as GSM, CDMA and LTE etc. Further, users of the system 100 may include relevant parties such as, but not limited to, individual users (e.g. consumers of services such as websites and/or software applications) and service providers (e.g. operators of web servers, websites, software applications, access control systems, etc.). Accordingly, in some instances, electronic devices operated by the one or more relevant parties may be in communication with the system.

A user 112, such as the one or more relevant parties, may access system 100 through a web based software application or browser. The web based software application may be embodied as, for example, but not be limited to, a website, a web application, a desktop application, and a mobile application compatible with a computing device 800 (not shown in the figure).

Figure 2:
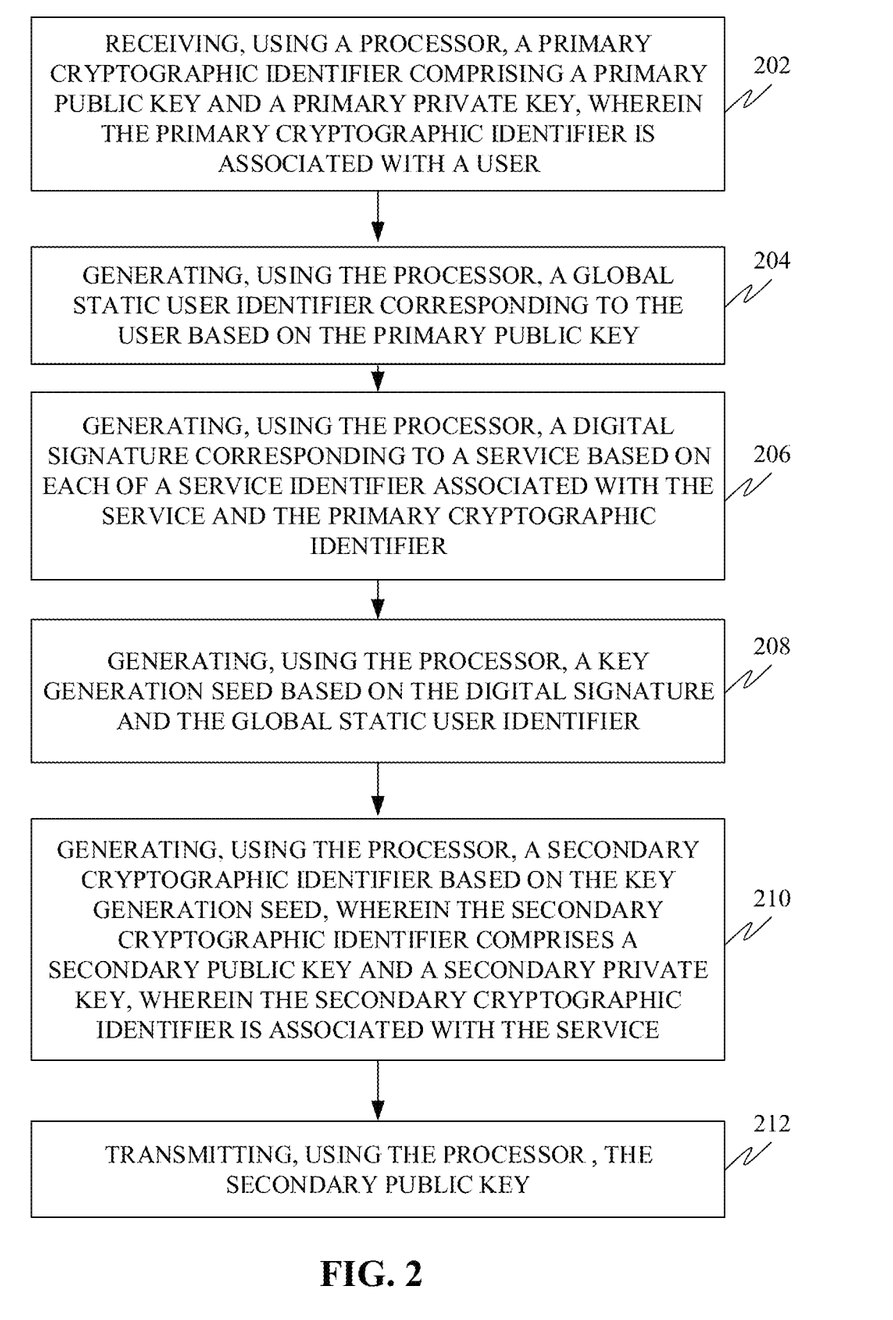
FIG. 2 shows a flowchart of a method to facilitate authentication of a user based on a secondary cryptographic identifier which is generated using a primary cryptographic identifier and a unique identifier, in accordance with some embodiments.

FIG. 2 shows a flowchart of a method to facilitate authentication of a user based on a secondary cryptographic identifier which is generated using a primary cryptographic identifier and a unique identifier, in accordance with some embodiments. Accordingly, the method may include a step 202 of performing at least one of generating and receiving, using a processor, a primary cryptographic identifier consisted of a primary public key and a primary private key. In some embodiments, each of the primary public key and the primary private key may be generated using a public-key cryptography key generation algorithm configured for producing deterministic digital signatures. Further, the primary cryptographic identifier may be associated with the user. Further, the method may include a step 204 of generating, using the processor, a global static user identifier corresponding to the user based on the primary public key. Further, the method may include a step 206 of generating, using the processor, a digital signature corresponding to a service based on a unique identifier associated with the service and the primary cryptographic identifier. In some embodiments, generating the digital signature may include cryptographically signing the unique identifier using the primary private key. Further, the digital signature may be deterministic. Further, the method may include a step 208 of generating, using the processor, a key generation seed based on the digital signature and the global static user identifier. In some embodiments, the key generation seed may be generated using a HMAC function. Further, a HMAC key associated with the HMAC function may include the digital signature and an input message associated with the HMAC function may include the global static user identifier. Further, the method may include a step 210 of generating, using the processor, a secondary cryptographic identifier based on the key generation seed. Further, the secondary cryptographic identifier may include a secondary public key and a secondary private key. Further, the secondary cryptographic identifier may be associated with the service. Further, the method may include a step 212 of secure transmission of the secondary public key to the service directly or via intermediary devices.

Figure 3:
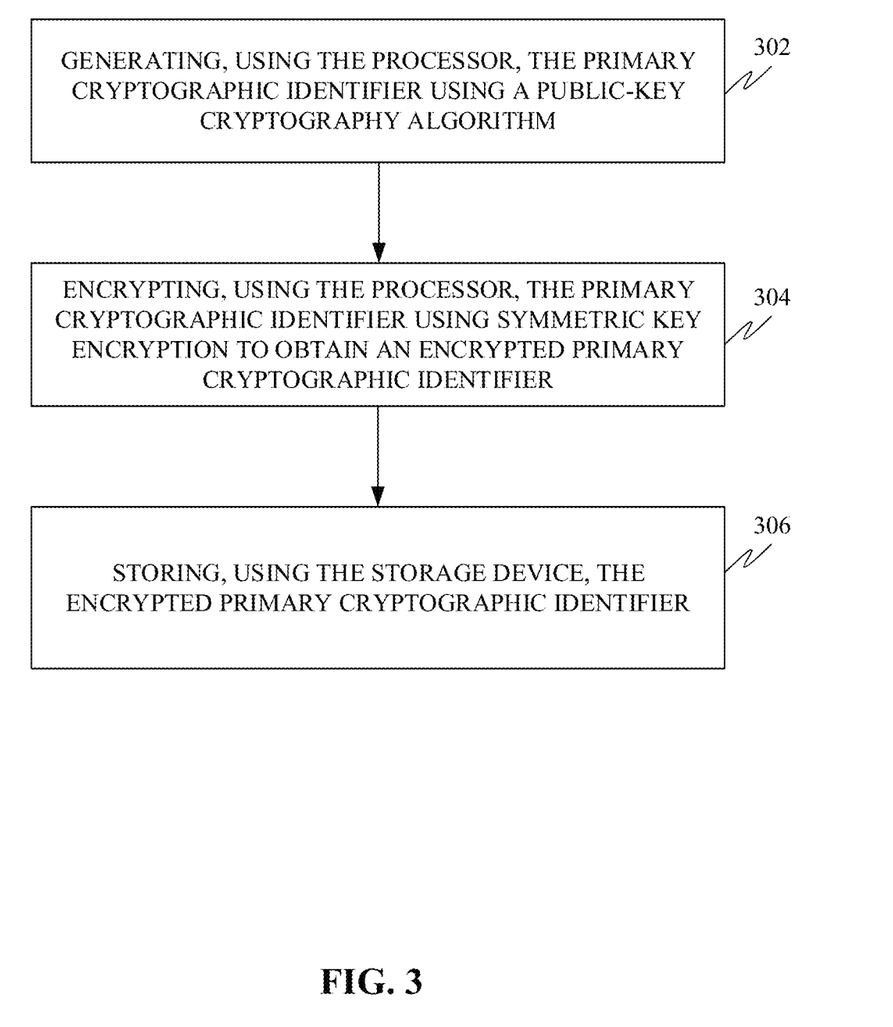
FIG. 3 shows a flowchart of a method to facilitate authentication of a user based on a secondary cryptographic identifier which is generated using a primary cryptographic identifier and a unique identifier, further including generation and encryption of the primary cryptographic identifier, in accordance with some embodiments.

FIG. 3 shows a flowchart of a method to facilitate authentication of a user based on a secondary cryptographic identifier which is generated using a primary cryptographic identifier and a unique identifier, further including generation and encryption of the primary cryptographic identifier, in accordance with some embodiments. Accordingly, the method may include a step 302 of generating, using the processor, the primary cryptographic identifier using a public-key cryptography key generation algorithm. Further, the method may include a step 304 of encrypting, using the processor, the primary cryptographic identifier using symmetric key encryption to obtain an encrypted primary cryptographic identifier. Further, the method may include a step 306 of storing, using the storage device, the encrypted primary cryptographic identifier.

Figure 4:
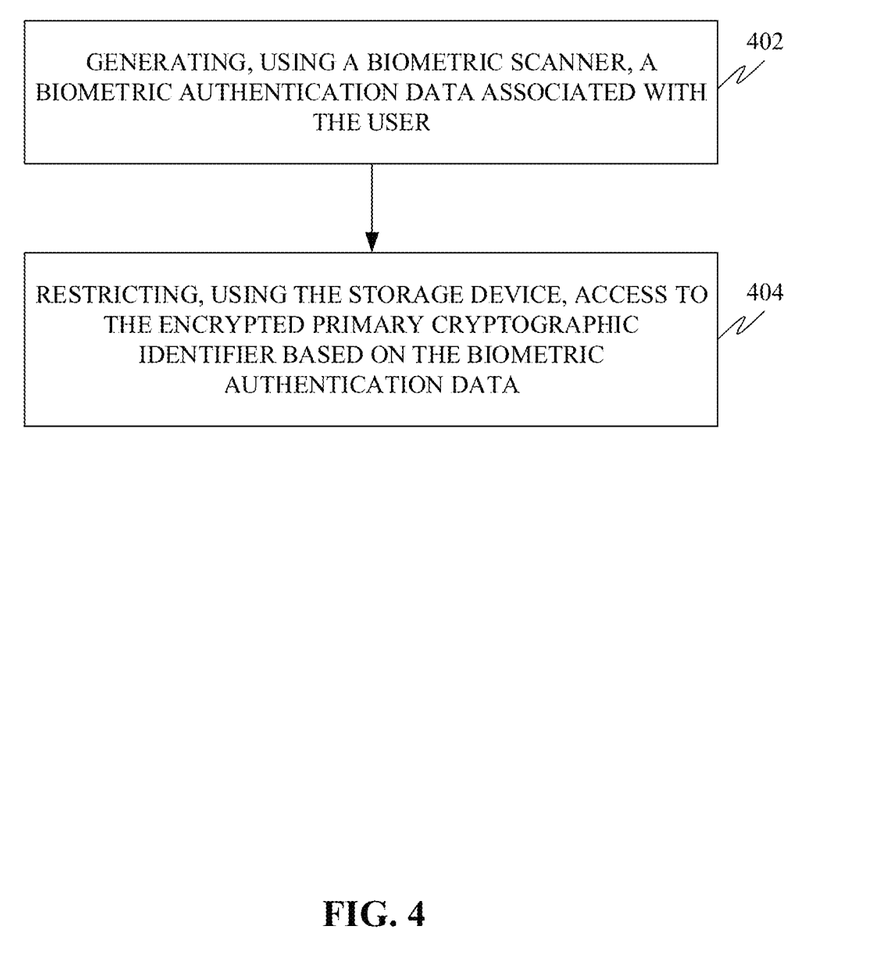
FIG. 4 shows a flowchart of a method to facilitate authentication of a user based on a secondary cryptographic identifier which is generated using a primary cryptographic identifier and a unique identifier, further including restricting access to the encrypted primary cryptographic identifier using access control mechanisms such as biometric scans and/or device passcode etc., in accordance with some embodiments.

FIG. 4 shows a flowchart of a method to facilitate authentication of a user based on a secondary cryptographic identifier which is generated using a primary cryptographic identifier and a unique identifier, further including restricting access to the encrypted primary cryptographic identifier using access control mechanisms such as biometric scans and/or device passcode etc. Accordingly, the method may include a step 402 of using a biometric sensor to authenticate user access to the device. Further, the method may include a step 404 of restricting, using the storage device, access to the encrypted primary cryptographic identifier based on the biometric authentication or passcode.

Figure 5:
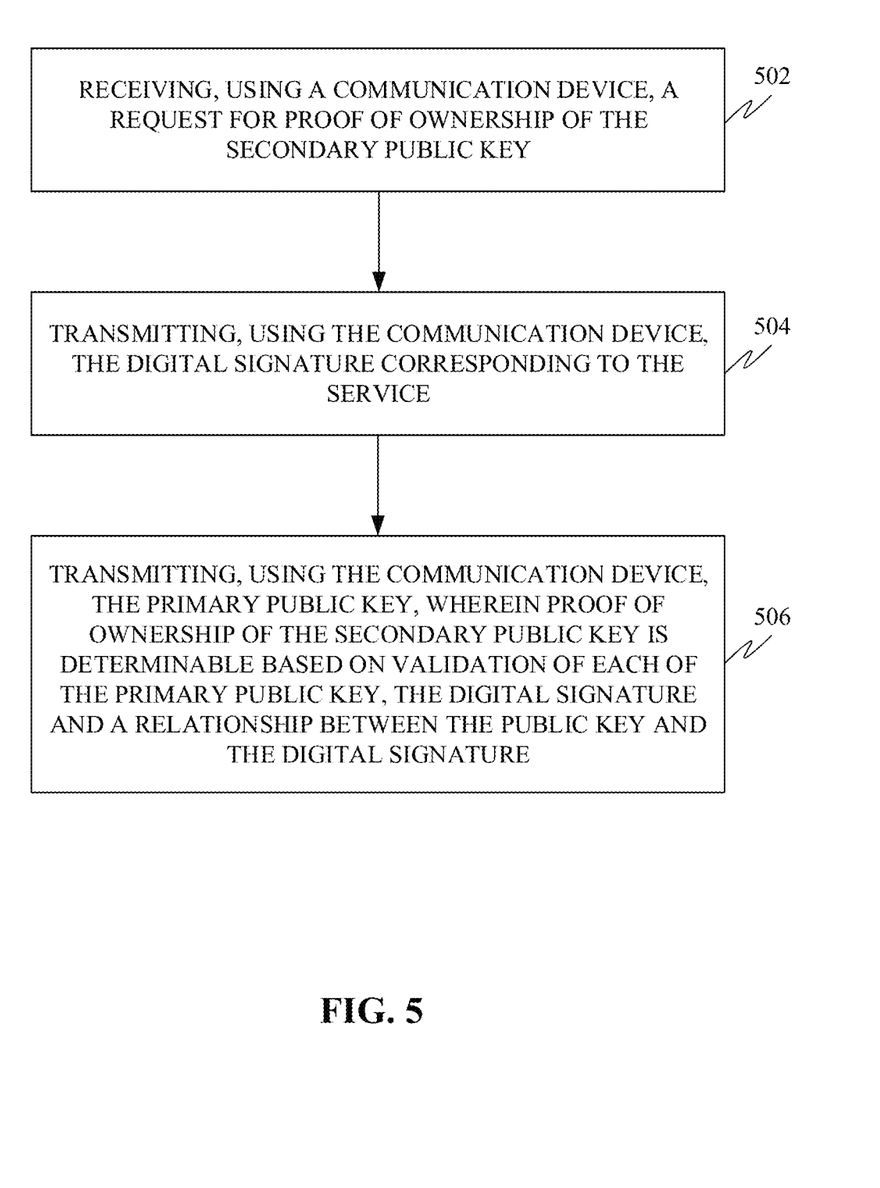
FIG. 5 shows a flowchart of a method to facilitate authentication of a user based on a secondary cryptographic identifier which is generated using a primary cryptographic identifier and a unique identifier, further including determining proof of ownership of a secondary public key, in accordance with some embodiments.

FIG. 5 shows a flowchart of a method to facilitate authentication of a user based on a secondary cryptographic identifier which is generated using a primary cryptographic identifier and a unique identifier, further including determining proof of ownership of a secondary public key, in accordance with some embodiments. Accordingly, the method may further include a step 502 of receiving, using a communication device, a request for proof of ownership of the secondary public key. Further, the method may include a step 504 of transmitting, using the communication device, the digital signature corresponding to the service. Further, the method may include a step 506 of transmitting, using the communication device, the primary public key. Further, proof of owner of the secondary public key may be determinable based on validation of each of the primary public key, the digital signature and a relationship between the public key and the digital signature.

Figure 6:
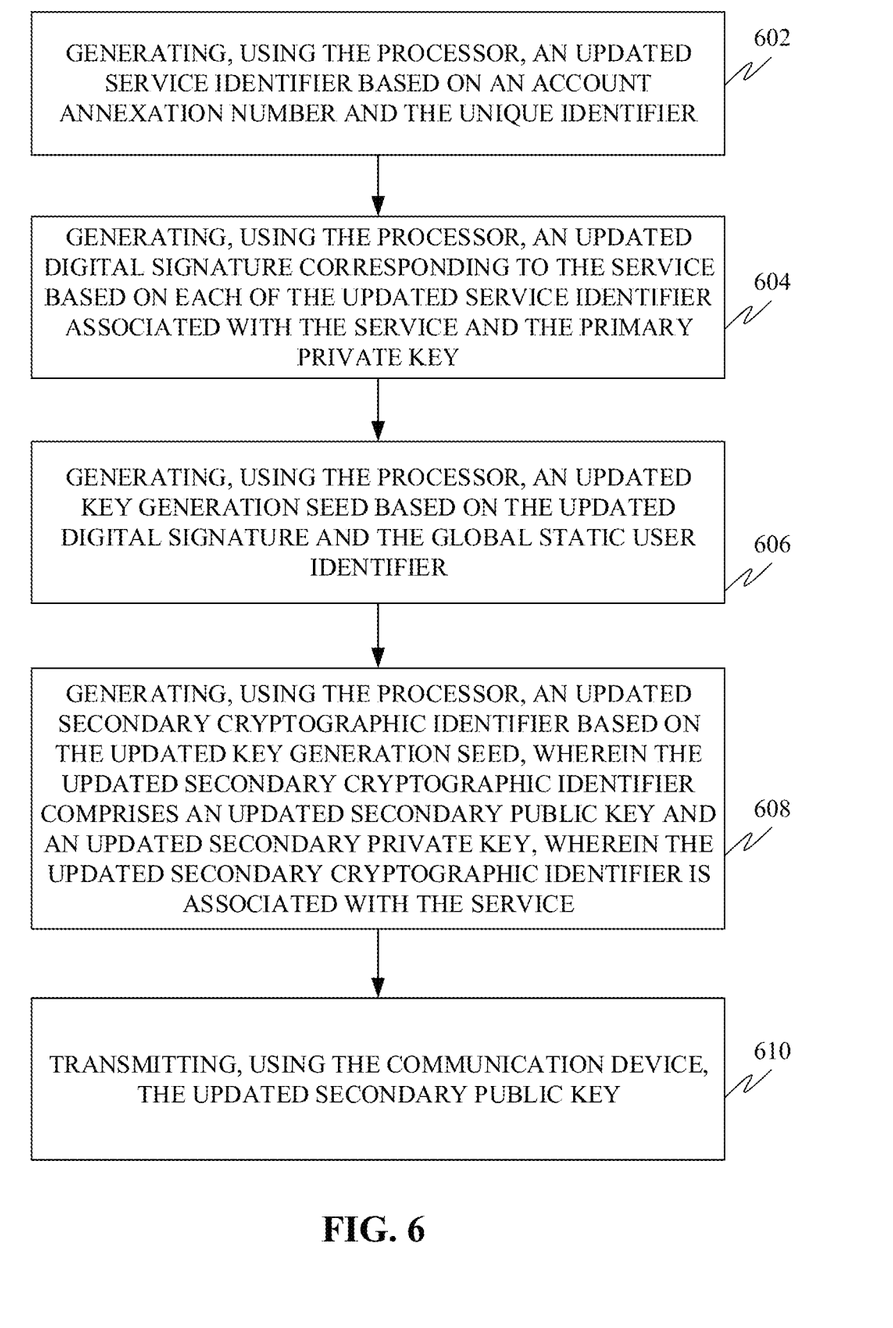
FIG. 6 shows a flowchart of a method to facilitate authentication of a user based on a secondary cryptographic identifier which is generated using a primary cryptographic identifier and a unique identifier, further including generating an updated secondary cryptographic identifier based on an updated unique identifier, in accordance with some embodiments.

FIG. 6 shows a flowchart of a method to facilitate authentication of a user based on a secondary cryptographic identifier which is generated using a primary cryptographic identifier and a unique identifier, further including generating an updated secondary cryptographic identifier based on an updated unique identifier, in accordance with some embodiments. Accordingly, the method may include a step 602 of generating, using the processor, an updated unique identifier based on an account annexation number and the unique identifier. In some embodiments, the generating of the updated unique identifier may include concatenating the account annexation number to the unique identifier. Further, the method may include a step 604 of generating, using the processor, an updated digital signature corresponding to the service based on each of the updated unique identifier associated with the service and the primary cryptographic identifier. Further, the method may include a step 606 of generating, using the processor, an updated key generation seed based on the updated digital signature and the global static user identifier. Further, the method may include a step 608 of generating, using the processor, an updated secondary cryptographic identifier based on the updated key generation seed. Further, the updated secondary cryptographic identifier may include an updated secondary public key and an updated secondary private key. Further, the updated secondary cryptographic identifier may be associated with the service. Further, the method may include a step 610 of transmitting, using the communication device, the updated secondary public key.

A processor for facilitating authentication of a user is also disclosed. The processor may be configured for performing at least one of generating and receiving a primary cryptographic identifier including a primary public key and a primary private key. Further, the primary cryptographic identifier may be associated with the user. In some embodiments, the processor may be further configured for generating the primary cryptographic identifier using a public-key cryptography key generation algorithm. Additionally, the processor may be configured for encrypting the primary cryptographic identifier using symmetric key encryption to obtain an encrypted primary cryptographic identifier. Further, the processor may be configured for storing, using the storage device, the encrypted primary cryptographic identifier. In some embodiments, the processor may be further configured using access control mechanisms such as biometric scans and/or device passcode etc. Additionally, the processor may be configured for restricting, using the storage device, access to the encrypted primary cryptographic identifier based on the biometric authentication or passcode.

Further, the processor may be configured for generating a global static user identifier corresponding to the user based on the primary public key. Further, the processor may be configured for generating a digital signature corresponding to a service based on a unique identifier associated with the service and the primary cryptographic identifier. In some embodiments, generating the digital signature may include digitally signing the unique identifier using the primary private key. Further, the digital signature may be deterministic. Further, the processor may be configured for generating a key generation seed based on the digital signature and the global static user identifier. In some embodiments, the key generation seed may be generated using a HMAC function. Further, a HMAC key associated with the HMAC function may include the digital signature and an input message associated with the HMAC function may include the global static user identifier. Further, the processor may be configured for generating a secondary cryptographic identifier based on the key generation seed. Further, the secondary cryptographic identifier may include a secondary public key and a secondary private key. Further, the secondary cryptographic identifier may be associated with the service.

In some embodiments, the processor may be further configured for receiving a unique request for proof corresponding to a plurality of public keys associated with the user. Additionally, the processor may be configured for generating a plurality of validation signatures corresponding to the plurality of public keys based on each of the unique request for proof and a plurality of secondary private keys. In some embodiments, the plurality of validation signatures may be generated further based on a timestamp associated with the unique request for proof. Further, a proof of ownership of the plurality of secondary private keys may be determinable based on the plurality of validation signatures.

In some embodiments, the processor may be further configured for receiving, using a communication device, a request for proof of ownership of the secondary public key. Further, the processor may be configured for transmitting, using the communication device, the digital signature corresponding to the service. Further, the processor may be configured for transmitting, using the communication device, the primary public key. Further, proof of owner of the secondary public key may be determinable based on validation of each of the primary public key, the digital signature and a relationship between the public key and the digital signature.

A portable computing device for facilitating authentication of a user is also disclosed. Further, the portable computing device may include a processor configured for generating a primary cryptographic identifier including a primary public key and a primary private key. Further, the primary cryptographic identifier may be associated with the user. Further, the processor may be configured for generating a global static user identifier corresponding to the user based on the primary public key. Further, the processor may be configured for generating a digital signature corresponding to a service based on a unique identifier associated with the service and the primary cryptographic identifier. Further, the processor may be configured for generating a key generation seed based on the digital signature and the global static user identifier. Further, the processor may be configured for generating a secondary cryptographic identifier based on the key generation seed. Further, the secondary cryptographic identifier may include a secondary public key and a secondary private key. Further, the secondary cryptographic identifier may be associated with the service.

Further, according to some embodiments, a system for facilitating authentication of a user is disclosed. The system may include a communication device configured for receiving a service request from a client device associated with a user. Further, the communication device may include a transmitting a unique session identifier to the client device. Further, the communication device may be configured for receiving a signed session identifier from the client device. Furthermore, the signed session identifier may be generated based on cryptographically signing the unique session identifier using a secondary private key of a secondary cryptographic identifier associated with the user. Further, the communication device may be configured for receiving a secondary public key of the secondary cryptographic identifier. Additionally, the system may include a processing device configured for generating the unique session identifier. Further, the processing device may be configured for validating the signed session identifier based on the secondary public key. Further, processing device may be configured for authenticating the user for provisioning of a service based on the validating.

Additionally, according to some embodiments, a system for facilitating authentication of a user is also disclosed. The system may include a communication device configured for receiving an authentication request including a unique session identifier from a service. Further, the communication device may be configured for delivering an authentication request including a unique session identifier to a mobile device bond with a user.

The system may also include an authentication server configured for receiving an authentication response including a signed session identifier from the user mobile device. Further, an authentication response may be generated based on cryptographically signing the unique session identifier using a secondary private key of a secondary cryptographic identifier associated with the user. Further, the authentication server may be configured for receiving a secondary public key of the secondary cryptographic identifier. Further, the system may include a processing device configured for generating the unique session identifier. Further, the processor may be configured for validating the signed session identifier based on the secondary public key. Further, the processor may be configured to authenticate the user access to the service based on the result of the session signature validation.

A portable computing device for facilitating authentication of a user is also disclosed. Further, the portable computing device may include a processor configured for receiving, through a communication device, a unique identifier associated with a service. Further, the processor may be configured for performing at least one of generating and receiving a primary cryptographic identifier including a primary public key and a primary private key. Further, the primary cryptographic identifier may be associated with the user from a storage device. Further, the processor may be configured for generating a digital signature corresponding to the service based on each of the unique identifier and the primary private key. Further, the processor may be configured for generating a secondary cryptographic identifier based on the primary cryptographic identifier and the digital signature. Further, the secondary cryptographic identifier may include a secondary public key and a secondary private key. Further, the secondary cryptographic identifier may be associated with the service. Further, the processor may be configured for transmitting, using intermediary devices(s), the secondary public key to the service. Further, registration of the user may be accomplished by the service based on the secondary public key.

Figure 7:
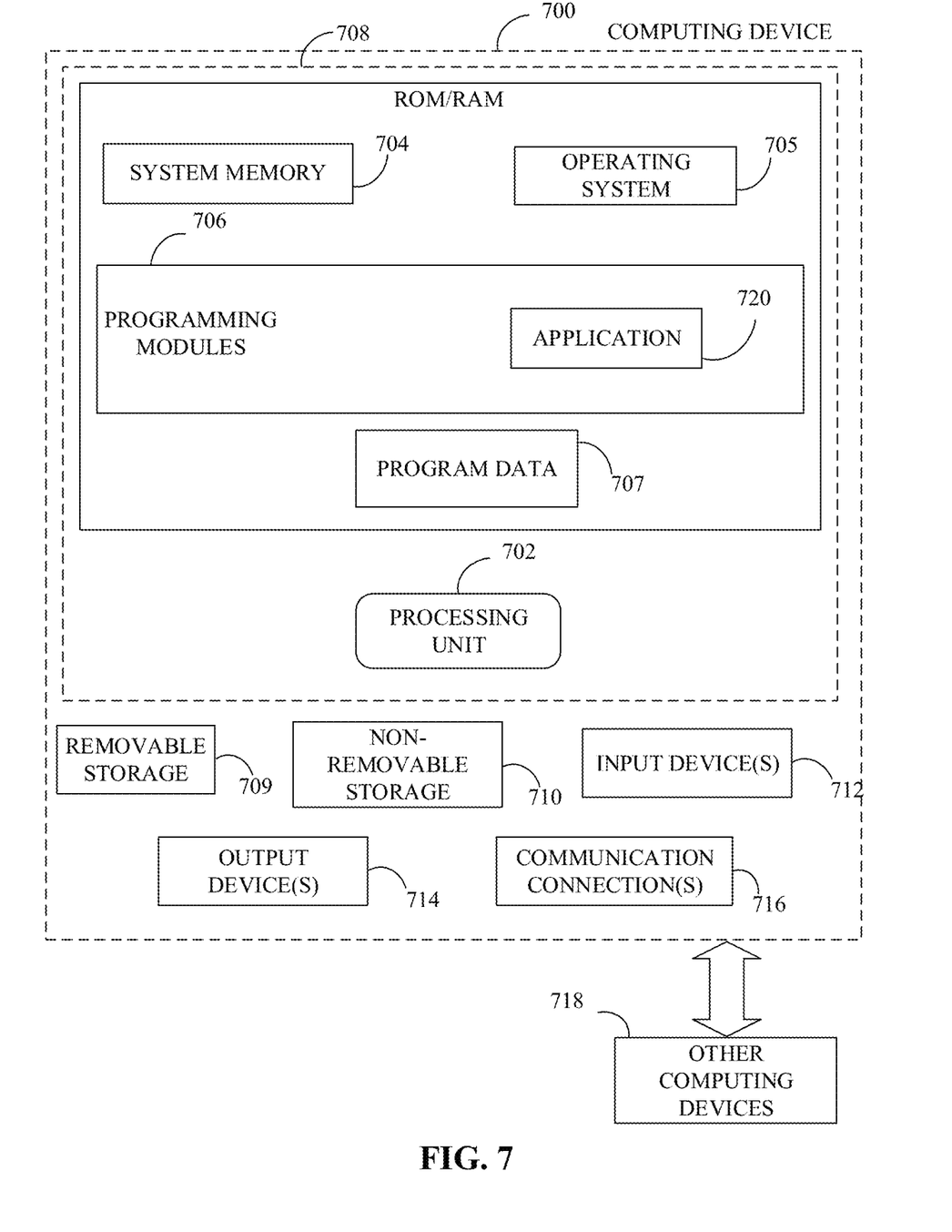
FIG. 7 is a block diagram of a computing device for implementing the methods disclosed herein, in accordance with some embodiments.

With reference to FIG. 7, a system consistent with an embodiment of the disclosure may include a computing device or cloud service, such as computing device 700. In a basic configuration, computing device 700 may include at least one processing unit 702 and a system memory 704. Depending on the configuration and type of computing device, system memory 704 may comprise, but is not limited to, volatile (e.g. random-access memory (RAM)), non-volatile (e.g. read-only memory (ROM)), flash memory, or any combination. System memory 704 may include operating system 705, one or more programming modules 706, and may include a program data 707. Operating system 705, for example, may be suitable for controlling computing device 700's operation. In one embodiment, programming modules 706 may include image-processing module, machine learning module. Furthermore, embodiments of the disclosure may be practiced in conjunction with a graphics library, other operating systems, or any other application program and is not limited to any particular application or system. This basic configuration is illustrated in FIG. 7 by those components within a dashed line 708.

Computing device 700 may have additional features or functionality. For example, computing device 700 may also include additional data storage devices (removable and/or non-removable) such as, for example, magnetic disks, optical disks, or tape. Such additional storage is illustrated in FIG. 7 by a removable storage 709 and a non-removable storage 710. Computer storage media may include volatile and nonvolatile, removable and non-removable media implemented in any method or technology for storage of information, such as computer-readable instructions, data structures, program modules, or other data. System memory 704, removable storage 709, and non-removable storage 710 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 700. Any such computer storage media may be part of device 700. Computing device 700 may also have input device(s) 712 such as a keyboard, a mouse, a pen, a sound input device, a touch input device, a location sensor, a camera, a biometric sensor, etc. Output device(s) 714 such as a display, speakers, a printer, etc. may also be included. The aforementioned devices are examples and others may be used.

Computing device 700 may also contain a communication connection 716 that may allow device 700 to communicate with other computing devices 718, such as over a network in a distributed computing environment, for example, an intranet or the Internet. Communication connection 716 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 704, including operating system 705. While executing on processing unit 702, programming modules 706 (e.g., application 720 such as a media player) may perform processes including, for example, one or more stages of methods, algorithms, systems, applications, servers, databases as described above. The aforementioned process is an example, and processing unit 702 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the disclosure has been explained in relation to its preferred embodiment, it is to be understood that many other possible modifications and variations can be made without departing from the spirit and scope of the disclosure.

The invention claimed is:

1. A method of facilitating authentication of a user, the method comprising:
    performing, using a processor, at least one of generating and receiving a primary cryptographic identifier comprising a primary public key and a primary private key, wherein the primary cryptographic identifier is associated with the user;
    generating, using the processor, a global static user identifier corresponding to the user based on the primary public key;
    generating, using the processor, a digital signature corresponding to a service based on a unique identifier associated with the service and the primary cryptographic identifier;
    generating, using the processor, a key generation seed based on the digital signature and the global static user identifier;
    generating, using the processor, a secondary cryptographic identifier based on the key generation seed, wherein the secondary cryptographic identifier comprises a secondary public key and a secondary private key, wherein the secondary cryptographic identifier is associated with the service; and
    transmitting, using the processor, the secondary public key.

2. The method of claim 1, wherein the key generation seed is generated using a HMAC function, wherein a HMAC key associated with the HMAC function comprises the digital signature and an input message associated with the HMAC function comprises the global static user identifier.

3. The method of claim 1, wherein generating the digital signature comprises cryptographically signing the unique identifier using the primary private key, wherein the digital signature is deterministic.

4. The method of claim 1, wherein each of the primary public key and the primary private key is generated using a public-key cryptography key generation algorithm configured for producing deterministic digital signatures.

5. The method of claim 1 further comprising:
    generating, using the processor, the primary cryptographic identifier using a public-key cryptography key generation algorithm;
    encrypting, using the processor, the primary cryptographic identifier using symmetric key encryption to obtain an encrypted primary cryptographic identifier;
    storing, using the storage device, the encrypted primary cryptographic identifier.

6. The method of claim 5, wherein further comprising:
    generating, using a biometric scanner, a biometric authentication data associated with the user; and
    restricting, using the storage device, access to the encrypted primary cryptographic identifier based on the biometric authentication data.

7. The method of claim 1 further comprising:
    receiving, using the processor, a unique request for proof corresponding to a plurality of secondary public keys associated with the user; and
    generating, using the processor, a plurality of validation signatures corresponding to the plurality of secondary public keys based on each of the unique request for proof and a plurality of secondary private keys, wherein a proof of ownership of the plurality of secondary private keys is determinable based on the plurality of validation signatures.

8. The method of claim 7, wherein the plurality of validation signatures is generated further based on a timestamp associated with the unique request for proof.

9. The method of claim 1 further comprising:
    receiving, using a communication device, a request for proof of ownership of the secondary public key;
    transmitting, using the communication device, the digital signature corresponding to the service; and
    transmitting, using the communication device, the primary public key, wherein proof of owner of the secondary public key is determinable based on validation of each of the primary public key, the digital signature and a relationship between the public key and the digital signature.

10. The method of claim 1 further comprising:
    generating, using the processor, an updated unique identifier based on an account annexation number and the unique identifier;
    generating, using the processor, an updated digital signature corresponding to the service based on each of the updated unique identifier associated with the service and the primary cryptographic identifier;

generating, using the processor, an updated key generation seed based on the updated digital signature and the global static user identifier;

generating, using the processor, an updated secondary cryptographic identifier based on the updated key generation seed, wherein the updated secondary cryptographic identifier comprises an updated secondary public key and an updated secondary private key, wherein the updated secondary cryptographic identifier is associated with the service; and transmitting, using the processor, the updated secondary public key.

11. The method of claim 10, wherein the generating of the updated unique identifier comprises concatenating the account annexation number to the unique identifier.

12. A processor for facilitating authentication of a user, the processor configured for:

receiving a primary cryptographic identifier comprising a primary public key and a primary private key, wherein the primary cryptographic identifier is associated with the user;

generating a global static user identifier corresponding to the user based on the primary public key;

generating a digital signature corresponding to a service based on a unique identifier associated with the service and the primary cryptographic identifier;

generating a key generation seed based on the digital signature and the global static user identifier; and generating a secondary cryptographic identifier based on the key generation seed, wherein the secondary cryptographic identifier comprises a secondary public key and a secondary private key, wherein the secondary cryptographic identifier is associated with the service.

13. The processor of claim 12, wherein generating the digital signature comprises digitally signing the unique identifier using the primary private key, wherein the digital signature is deterministic.

14. The processor of claim 12, wherein the processor is further configured for:

generating the primary cryptographic identifier using a public-key cryptography key generation algorithm;

encrypting the primary cryptographic identifier using symmetric key encryption to obtain an encrypted primary cryptographic identifier;

storing, using the storage device, the encrypted primary cryptographic identifier.

15. The processor of claim 14, wherein the processor is further configured for:

generating, using a biometric scanner, a biometric authentication data associated with the user; and restricting, using the storage device, access to the encrypted primary cryptographic identifier based on the biometric authentication data.

16. The processor of claim 11, wherein the processor is further configured for:

receiving a unique request for proof corresponding to a plurality of secondary public keys associated with the user; and generating a plurality of validation signatures corresponding to the plurality of secondary public keys based on each of the unique request for proof and a plurality of secondary private keys, wherein a proof of ownership of the plurality of secondary private keys is determinable based on the plurality of validation signatures.

17. The processor of claim 16, wherein the plurality of validation signatures is generated further based on a timestamp associated with the unique request for proof.

18. The processor of claim 11, wherein the key generation seed is generated using a HMAC function, wherein a HMAC key associated with the HMAC function comprises the digital signature and an input message associated with the HMAC function comprises the global static user identifier.

19. The processor of claim 11 further configured for:

receiving, using a communication device, a request for proof of ownership of the secondary public key;

transmitting, using the communication device, the digital signature corresponding to the service; and transmitting, using the communication device, the primary public key, wherein proof of owner of the secondary public key is determinable based on validation of each of the primary public key, the digital signature and a relationship between the public key and the digital signature.

20. A portable computing device for facilitating authentication of a user, wherein the portable computing device comprises a processor configured for:

performing, using the processor, at least one of generating and receiving a primary cryptographic identifier comprising a primary public key and a primary private key, wherein the primary cryptographic identifier is associated with the user;

generating a global static user identifier corresponding to the user based on the primary public key;

generating a digital signature corresponding to a service based on a unique identifier associated with the service and the primary cryptographic identifier;

generating a key generation seed based on the digital signature and the global static user identifier; and generating a secondary cryptographic identifier based on the key generation seed, wherein the secondary cryptographic identifier comprises a secondary public key and a secondary private key, wherein the secondary cryptographic identifier is associated with the service.

21. A system for facilitating authentication of a user, the system comprising:

a communication device configured for:
  receiving a service request from a client device associated with a user;
  transmitting a unique session identifier to the client device;
  receiving a signed session identifier from the client device,
  wherein the signed session identifier is generated based on cryptographically signing the unique session identifier using a secondary private key of a secondary cryptographic identifier associated with the user; and
  receiving a secondary public key of the secondary cryptographic identifier;

a processing device configured for:
  generating the unique session identifier;
  validating the signed session identifier based on the secondary public key; and
  authenticating the user for provisioning of a service based on the validating.

22. A portable computing device for facilitating authentication of a user, wherein the portable computing device comprises a processor configured for:

receiving, using a communication device, a unique identifier associated with a service from a service provider device;

performing at least one of generating and receiving a primary cryptographic identifier comprising a primary public key and a primary private key, wherein the primary cryptographic identifier is associated with the user from a storage device;

generating a digital signature corresponding to the service based on each of the unique identifier and the primary private key;

generating a secondary cryptographic identifier based on the primary cryptographic identifier and the digital signature, wherein the secondary cryptographic identifier comprises a secondary public key and a secondary private key, wherein the secondary cryptographic identifier is associated with the service; and transmitting the secondary public key to the service provider device, wherein registration and authentication of the user is performable by the service provider device based on the secondary public key.

* * * * *